(12) United States Patent
Aguera y Arcas

(10) Patent No.: US 7,133,054 B2
(45) Date of Patent: Nov. 7, 2006

(54) METHODS AND APPARATUS FOR NAVIGATING AN IMAGE

(75) Inventor: Blaise Aguera y Arcas, Seattle, WA (US)

(73) Assignee: Seadragon Software, Inc., Seattle, WA (US)

( * ) Notice: Subject to any disclaimer, the term of this patent is extended or adjusted under 35 U.S.C. 154(b) by 52 days.

(21) Appl. No.: 10/803,010

(22) Filed: Mar. 17, 2004

(65) Prior Publication Data
US 2005/0206657 A1   Sep. 22, 2005

(51) Int. Cl.
G06T 15/00 (2006.01)

(52) U.S. Cl. .................. 345/666; 382/298; 701/212

(58) Field of Classification Search ............ 345/619, 345/660, 661, 666–668; 701/208, 212; 382/298; 715/764
See application file for complete search history.

(56) References Cited

U.S. PATENT DOCUMENTS

| | | | | |
|---|---|---|---|---|
| 4,532,605 A * | 7/1985 | Waller | ............ | 345/661 |
| 6,034,661 A * | 3/2000 | Servan-Scheiber et al. | . | 345/668 |
| 6,360,029 B1 * | 3/2002 | Moller | ............ | 382/298 |
| 6,392,661 B1 * | 5/2002 | Tankersley | ............ | 345/660 |
| 6,476,829 B1 * | 11/2002 | Smith et al. | ............ | 715/764 |
| 6,907,345 B1 * | 6/2005 | Shipley et al. | ............ | 701/212 |
| 6,912,462 B1 * | 6/2005 | Ogaki | ............ | 701/208 |
| 6,927,782 B1 * | 8/2005 | Coldefy et al. | ............ | 345/619 |
| 6,943,811 B1 * | 9/2005 | Matthews | ............ | 345/660 |

* cited by examiner

Primary Examiner—Phu K. Nguyen
(74) Attorney, Agent, or Firm—Shook, Hardy & Bacon L.L.P.

(57) ABSTRACT

Methods and apparatus are contemplated to perform various actions, including: zooming into or out of an image having at least one object, wherein at least some elements of the at least one object are scaled up and/or down in a way that is non-physically proportional to one or more zoom levels associated with the zooming, and wherein, for example, the non-physically proportional scaling may be expressed by the following formula: $p = d' \cdot z^a$, where p is a linear size in pixels of one or more elements of the object at the zoom level, d' is an imputed linear size of the one or more elements of the object in physical units, z is the zoom level in units of physical linear size/pixel, and a is a power law where $a \ne -1$.

33 Claims, 17 Drawing Sheets

100A

100B

100C

METHODS AND APPARATUS FOR NAVIGATING AN IMAGE

Additional details concerning other techniques for blending images, which may be employed in connection with implementing the present invention, may be found in U.S. Provisional Patent Application No. 60/475,897, entitled SYSTEM AND METHOD FOR THE EFFICIENT, DYNAMIC AND CONTINUOUS DISPLAY OF MULTI RESOLUTIONAL VISUAL DATA, filed Jun. 5, 2003, the entire disclosure of which is hereby incorporated by reference. Still further details concerning blending techniques that may be employed in connection with implementing the present invention may be found in U.S. Provisional Patent Application Ser. No. 60/453,897, filed Mar. 12, 2003, entitled SYSTEM AND METHOD FOR FOVEATED, SEAMLESS, PROGRESSIVE RENDERING IN A ZOOMING USER INTERFACE, the entire disclosure of which is hereby incorporated by reference.

BACKGROUND OF THE INVENTION

The present invention relates to methods and apparatus for navigating, such as zooming and panning, over an image of an object in such a way as to provide the appearance of smooth, continuous navigational movement.

Most conventional graphical computer user interfaces (GUIs) are designed using visual components of fixed spatial scale, it has long been recognized, however, that visual components may be represented and manipulated such that they do not have a fixed spatial scale on the display; indeed, the visual components may be panned and/or zoomed in or out. The ability to zoom in and out on an image is desirable in connection with, for example, viewing maps, browsing through text layouts such as newspapers, viewing digital photographs, viewing blueprints or diagrams, and viewing other large data sets.

Many existing computer applications, such as Microsoft Word, Adobe Photo Shop, Adobe Acrobat, etc., include zoomable components. In general, the zooming capability provided by these computer applications is a peripheral aspect of a user's interaction with the software and the zooming feature is only employed occasionally. These computer applications permit a user to pan over an image smoothly and continuously (e.g., utilizing scroll bars or the cursor to translate the viewed image left, right, up or down). A significant problem with such computer applications, however, is that they do not permit a user to zoom smoothly and continuously. Indeed, they provide zooming in discrete steps, such as 10%, 25%, 50%, 75%, 100%, 150%, 200%, 500%, etc. The user selects the desired zoom using the cursor and, in response, the image changes abruptly to the selected zoom level.

The undesirable qualities of discontinuous zooming also exist in Internet-based computer applications. The computer application underlying the www.mapquest.com website illustrates this point. The MapQuest website permits a user to enter one or more addresses and receive an image of a roadmap in response. FIGS. 1–4 are examples of images that one may obtain from the MapQuest website in response to a query for a regional map of Long Island, N.Y., U.S.A. The MapQuest website permits the user to zoom in and zoom out to discrete levels, such as 10 levels. FIG. 1 is a rendition at zoom level 5, which is approximately 100 meters/pixel. FIG. 2 is an image at a zoom level 6, which is about 35 meters/pixel. FIG. 3 is an image at a zoom level 7, which is about 20 meters/pixel. FIG. 4 is an image at a zoom level 9, which is about 10 meters/pixel.

As can be seen by comparing FIGS. 1–4, the abrupt transitions between zoom levels result in a sudden and abrupt loss of detail when zooming out and a sudden and abrupt addition of detail when zooming in. For example, no local, secondary or connecting roads may be seen in FIG. 1 (at zoom level 5), although secondary and connecting roads suddenly appear in FIG. 2, which is the very next zoom level. Such abrupt discontinuities are very displeasing when utilizing the MapQuest website. It is noted, however, that even if the MapQuest software application were modified to permit a view of, for example, local streets at zoom level 5 (FIG. 1), the results would still be unsatisfactory. Although the visual density of the map would change with the zoom level such that at some level of zoom, the result might be pleasing (e.g., at level 7, FIG. 3), as one zoomed in the roads would not thicken, making the map look overly sparse. As one zoomed out, the roads would eventually run into each other, rapidly forming a solid nest in which individual roads would be indistinguishable.

The ability to provide smooth, continuous zooming on images of road maps is problematic because of the varying levels of coarseness associated with the road categories. In the United States, there are about five categories of roads (as categorized under the Tiger/Line Data distributed by the U.S. Census Bureau): A1, primary highways; A2, primary roads; A3, state highways, secondary roads, and connecting roads; A4, local streets, city streets and rural roads; and A5, dirt roads. These roads may be considered the elements of an overall object (i.e., a roadmap). The coarseness of the road elements manifests because there are considerably more A4 roads than A3 roads, there are considerably more A3 roads than A2 roads, and there are considerably more A2 roads than A1 roads. In addition, the physical dimensions of the roads (e.g., their widths), vary significantly. A1 roads may be about 16 meters wide, A2 roads may be about 12 meters wide, A3 roads may be about 8 meters wide, A4 roads may be about 5 meters wide, and A5 roads may be about 2.5 meters wide.

The MapQuest computer application deals with these varying levels of coarseness by displaying only the road categories deemed appropriate at a particular zoom level. For example, a nation-wide view might only show A1 roads, while a state-wide view might show A1 and A2 roads, and a county-wide view might show A1, A2 and A3 roads. Even if MapQuest were modified to allow continuous zooming of the roadmap, this approach would lead to the sudden appearance and disappearance of road categories during zooming, which is confusing and visually displeasing.

In view of the foregoing, there are needs in the art for new methods and apparatus for navigating images of complex objects, which permit smooth and continuous zooming of the image while also preserving visual distinctions between the elements of the objects based on their size or importance.

SUMMARY OF THE INVENTION

In accordance with one or more aspects of the present invention, methods and apparatus are contemplated to perform various actions, including: zooming into or out of an image having at least one object, wherein at least some elements of at least one object are scaled up and/or down in a way that is non-physically proportional to one or more zoom levels associated with the zooming.

The non-physically proportional scaling may be expressed by the following formula: $p = c \cdot d \cdot z^a$, where p is a linear size in pixels of one or more elements of the object at the zoom level, c is a constant, d is a linear size in physical units of the one or more elements of the object, z is the zoom level in units of physical linear size/pixel, and a is a scale power where $a \neq -1$.

Under non-physical scaling, the scale power a is not equal to $-1$ (typically $-1 < a < 0$) within a range of zoom levels z0 and z1, where z0 is of a lower physical linear size/pixel than z1. Preferably, at least one of z0 and z1 may vary for one or more elements of the object. It is noted that a, c and d may also vary from element to element.

At least some elements of the at least one object may also be scaled up and/or down in a way that is physically proportional to one or more zoom levels associated with the zooming. The physically proportional scaling may be expressed by the following formula: $p = c \cdot d / z$, where p is a linear size in pixels of one or more elements of the object at the zoom level, c is a constant, d is a linear size of the one or more elements of the object in physical units, and z is the zoom level in units of physical linear size/pixel.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. The invention may also be embodied in a software program for storage in a suitable storage medium and execution by a processing unit.

The elements of the object may be of varying degrees of coarseness. For example, as discussed above, the coarseness of the elements of a roadmap object manifests because there are considerably more A4 roads than A3 roads, there are considerably more A3 roads than A2 roads, and there are considerably more A2 roads than A1 roads. Degree of coarseness in road categories also manifests in such properties as average road length, frequency of intersections, and maximum curvature. The coarseness of the elements of other image objects may manifest in other ways too numerous to list in their entirety. Thus, the scaling of the elements in a given predetermined image may be physically proportional or non-physically proportional based on at least one of: (i) a degree of coarseness of such elements; and (ii) the zoom level of the given predetermined image. For example, the object may be a roadmap, the elements of the object may be roads, and the varying degrees of coarseness may be road hierarchies. Thus; the scaling of a given road in a given predetermined image may be physically proportional or non-physically proportional based on: (i) the road hierarchy of the given road; and (ii) the zoom level of the given predetermined image.

In accordance with one or more further aspects of the present invention, methods and apparatus are contemplated to perform various actions, including: receiving at a client terminal a plurality of pre-rendered images of varying zoom levels of a roadmap; receiving one or more user navigation commands including zooming information at the client terminal; and blending two or more of the pre-rendered images to obtain an intermediate image of an intermediate zoom level that corresponds with the zooming information of the navigation commands such that a display of the intermediate image on the client terminal provides the appearance of smooth navigation.

In accordance with one or more still further aspects of the present invention, methods and apparatus are contemplated to perform various actions, including: receiving at a client terminal a plurality of pre-rendered images of varying zoom levels of at least one object, at least some elements of the at least one object being scaled up and/or down in order to produce the plurality of pre-determined images, and the scaling being at least one of: (i) physically proportional to the zoom level; and (ii) non-physically proportional to the zoom level; receiving one or more user navigation commands including zooming information at the client terminal; blending two or more of the pre-rendered images to obtain an intermediate image of an intermediate zoom level that corresponds with the zooming information of the navigation commands; and displaying the intermediate image on the client terminal.

In accordance with one or more still further aspects of the present invention, methods and apparatus are contemplated to perform various actions, including: transmitting a plurality of pre-rendered images of varying zoom levels of a roadmap to a client terminal over a communications channel; receiving the plurality of pre-rendered images at the client terminal; issuing one or more user navigation commands including zooming information using the client terminal; and blending two or more of the pre-rendered images to obtain an intermediate image of an intermediate zoom level that corresponds with the zooming information of the navigation commands such that a display of the intermediate image on the client terminal provides the appearance of smooth navigation.

In accordance with one or more still further aspects of the present invention, methods and apparatus are contemplated to perform various actions, including: transmitting a plurality of pre-rendered images of varying zoom levels of at least one object to a client terminal over a communications channel, at least some elements of the at least one object being scaled up and/or down in order to produce the plurality of pre-determined images, and the scaling being at least one of: (i) physically proportional to the zoom level; and (ii) non-physically proportional to the zoom level; receiving the plurality of pre-rendered images at the client terminal; issuing one or more user navigation commands including zooming information using the client terminal; blending two of the pre-rendered images to obtain an intermediate image of an intermediate zoom level that corresponds with the zooming information of the navigation commands; and displaying the intermediate image on the client terminal.

Other aspects, features, and advantages will become apparent to one of ordinary skill in the art when the description herein is taken in conjunction with the accompanying drawings.

BRIEF DESCRIPTION OF THE DRAWINGS

For the purposes of illustrating the invention, forms are shown in the drawing, it being understood, however, that the invention is not limited to the precise arrangements and instrumentalities shown.

DETAILED DESCRIPTION OF THE INVENTION

Figure 1:
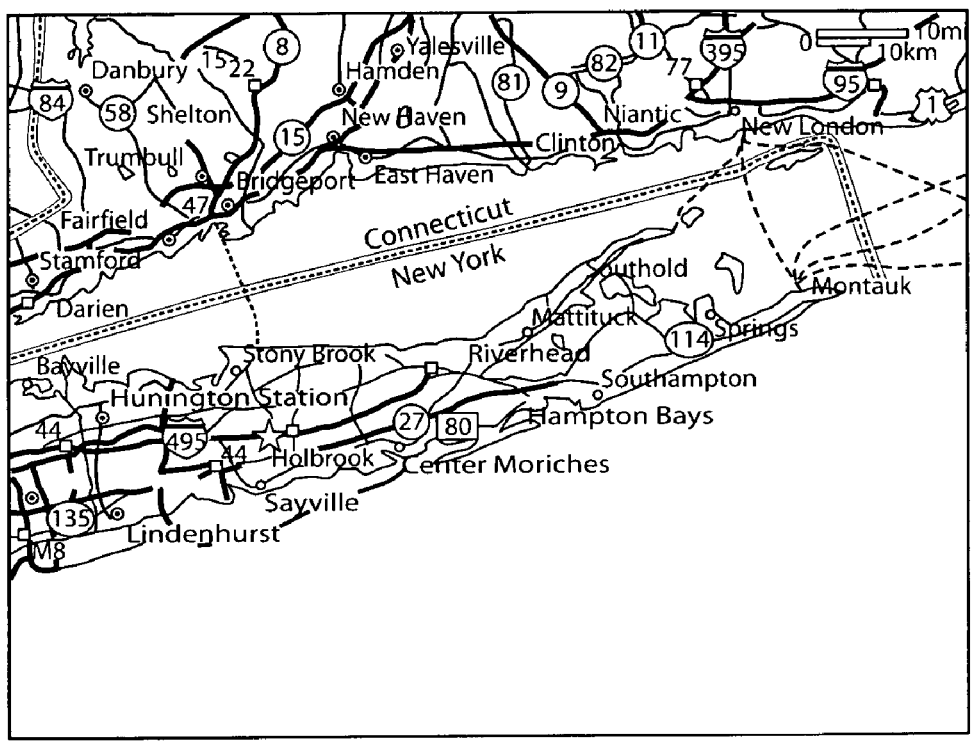
FIG. 1 is an image taken from the MapQuest website, which is at a zoom level 5.
Figure 2:
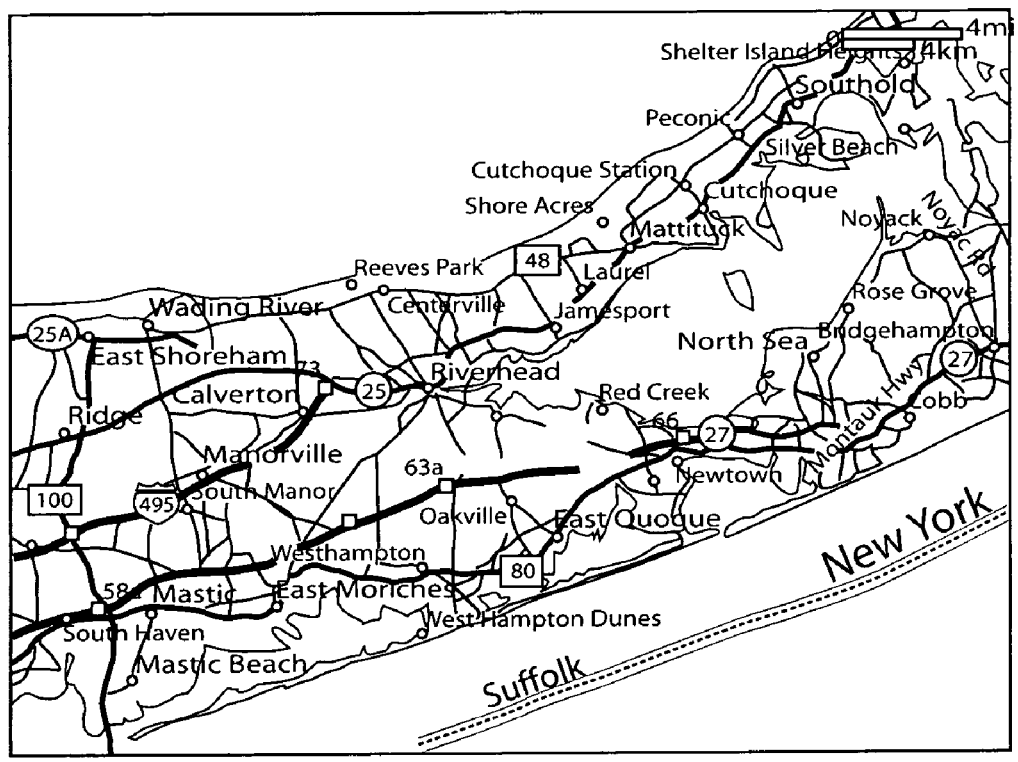
FIG. 2 is an image taken from the MapQuest website, which is at a zoom level 6.
Figure 3:
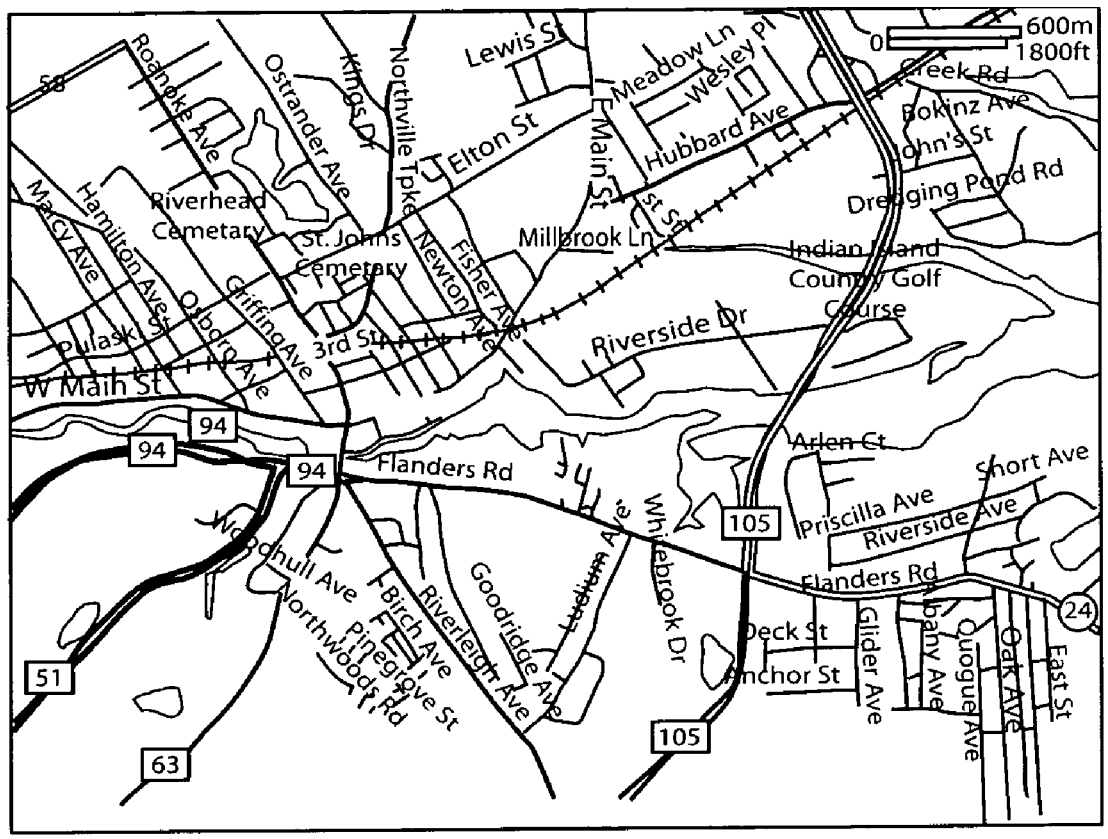
FIG. 3 is an image taken from the MapQuest website, which is at a zoom level 7.
Figure 4:
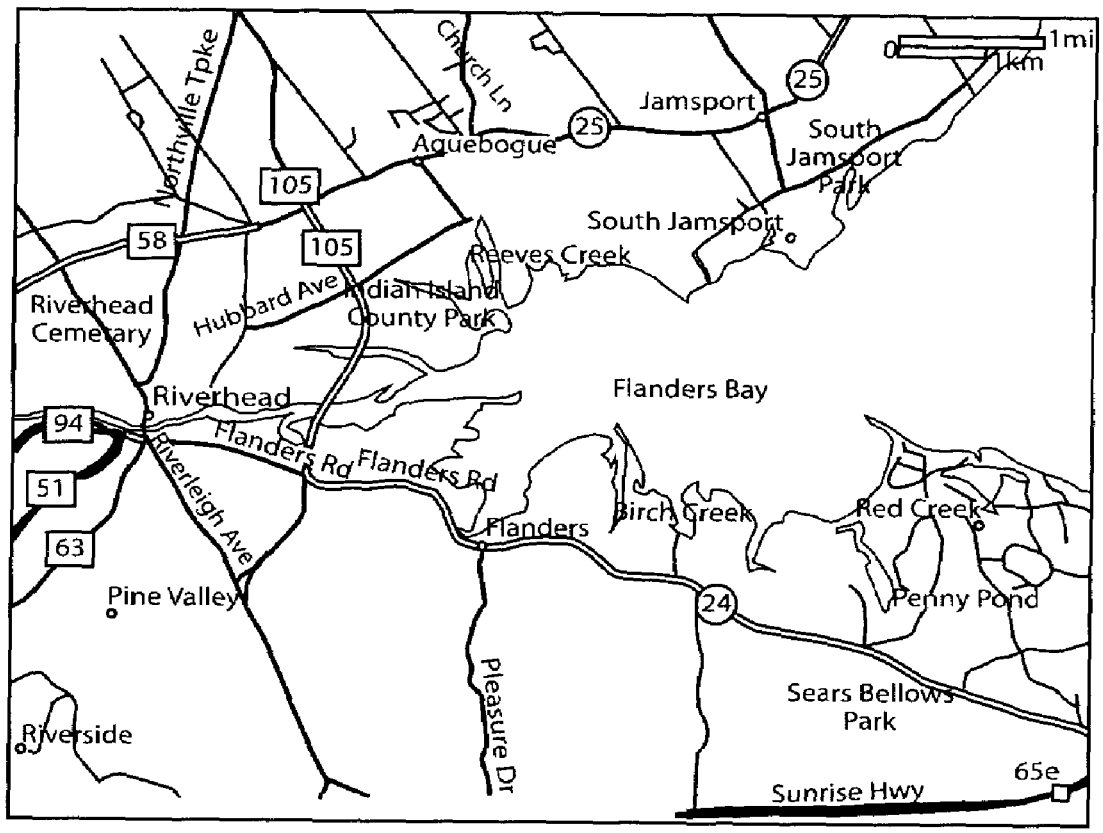
FIG. 4 is an image taken from the MapQuest website, which is at a zoom level 9.

Referring now to the drawings, wherein like numerals indicate like elements, there is shown in FIGS. 5–11 a series of images representing the road system of Long Island, N.Y., U.S.A. where each image is at a different zoom level (or resolution). Before delving into the technical details of how the present invention is implemented, these images will now be discussed in connection with desirable resultant features of using the invention, namely, at least the appearance of smooth and continuous navigation, particularly zooming, while maintaining informational integrity.

It is noted that the various aspects of the present invention that will be discussed below may be applied in contexts other than the navigation of a roadmap image. Indeed, the extent of images and implementations for which the present invention may be employed are too numerous to list in their entirety. For example, the features of the present invention may be used to navigate images of the human anatomy, complex topographies, engineering diagrams such as wiring diagrams or blueprints, gene ontologies, etc. It has been found, however, that the invention has particular applicability to navigating images in which the elements thereof are of varying levels of detail or coarseness. Therefore, for the purposes of brevity and clarity, the various aspects of the present invention will be discussed in connection with a specific example, namely, images of a roadmap.

Figure 5:
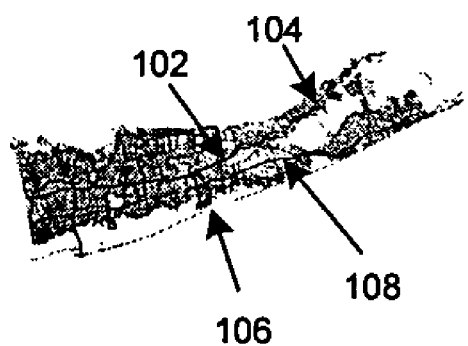
FIG. 5 is an image of Long Island produced at a zoom level of about 334 meters/pixel in accordance with one or more aspects of the present invention.
Figure 6:
FIG. 6 is an image of Long Island produced at a zoom level of about 191 meters/pixel in accordance with one or more further aspects of the present invention.
Figure 7:
FIG. 7 is an image of Long Island produced at a zoom level of about 109.2 meters/pixel in accordance with one or more further aspects of the present invention.

Although it is impossible to demonstrate the appearance of smooth and continuous zooming in a patent document, this feature has been demonstrated through experimentation and prototype development by executing a suitable software program on a Pentium-based computer. The image 100A of the roadmap illustrated in FIG. 5 is at a zoom level that may be characterized by units of physical length/pixel (or physical linear size/pixel). In other words, the zoom level, z, represents the actual physical linear size that a single pixel of the image 100A represents. In FIG. 5, the zoom level is about 334 meters/pixel. Those skilled in the art will appreciate that the zoom level may be expressed in other units without departing from the spirit and scope of the claimed invention. FIG. 6 is an image 100B of the same roadmap as FIG. 5, although the zoom level, z, is about 191 meters/pixel.

In accordance with one or more aspects of the present invention, a user of the software program embodying one or more aspects of the invention may zoom in or out between the levels illustrated in FIGS. 5 and 6. It is significant to note that such zooming has the appearance of smooth and continuous transitions from the 334 meters/pixel level (FIG. 5) to/from the 191 meters/pixel level (FIG. 6) and any levels therebetween. Likewise, the user may zoom to other levels, such as z=109.2 meters/pixel (FIG. 7), z=62.4 meters/pixel (FIG. 8), z=35.7 meters/pixel (FIG. 9), z=20.4 meters/pixel (FIG. 10), and z=11.7 meters/pixel (FIG. 11). Again, the transitions through these zoom levels and any levels therebetween advantageously have the appearance of smooth and continuous movements.

Another significant feature of the present invention as illustrated in FIGS. 5–11 is that little or no detail abruptly appears or disappears when zooming from one level to another level. The detail shown in FIG. 8 (at the zoom level of z=62.4 meters/pixel) may also be found in FIG. 5 (at a zoom level of z=334 meters/pixel). This is so even though the image object, in this case the roadmap, includes elements (i.e., roads) of varying degrees of coarseness. Indeed, the roadmap 100D of FIG. 8 includes at least A1 highways such as 102, A3 secondary roads such as 104, and A4 local roads such as 106. Yet these details, even the A4 local roads 106, may still be seen in image 100A of FIG. 5, which is substantially zoomed out in comparison with the image 100D of FIG. 8.

Still further, despite that the A4 local roads 106 may be seen at the zoom level of z=334 meters/pixel (FIG. 5) the A1, A2, A3, and A4 roads may be distinguished from one another. Even differences between A1 primary highways 102 and A2 primary roads 108 may be distinguished from one another vis-à-vis the relative weight given to such roads in the rendered image 100A.

Figure 10:
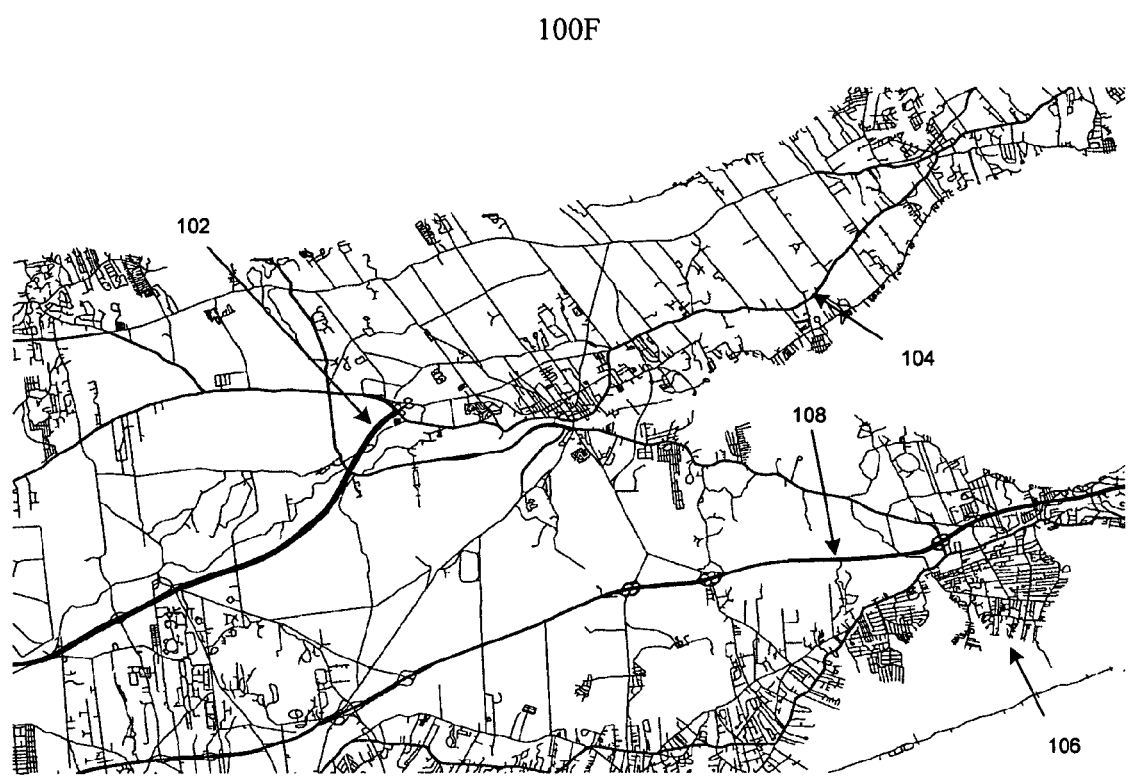
FIG. 10 is an image of Long Island produced at a zoom level of about 20.4 meters/pixel in accordance with one or more further aspects of the present invention.
Figure 11:
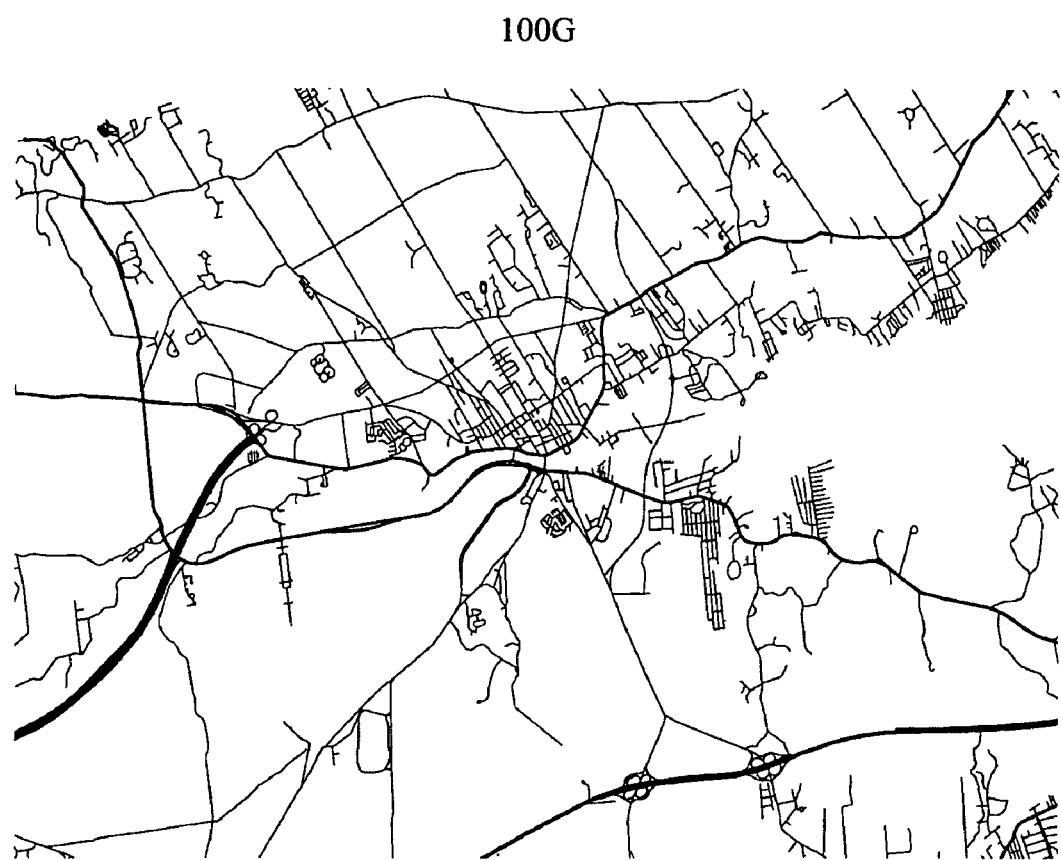
FIG. 11 is an image of Long Island produced at a zoom level of about 11.7 meters/pixel in accordance with one or more further aspects of the present invention.

The ability to distinguish among the road hierarchies is also advantageously maintained when the user continues to zoom in, for example, to the zoom level of z=20.4 meters/pixel as illustrated in image 100F of FIG. 10. Although the weight of the A1 primary highway 102 significantly increases as compared with the zoom level of z=62.4 meters/pixel in FIG. 8, it does not increase to such an extent as to obliterate other detail, such as the A4 local roads 106 or even the A5 dirt roads. Nevertheless, the weights of the roads at lower hierarchical levels, such as A4 local roads 106 significantly increase in weight as compared with their counterparts at the zoom level z=62.4 meters/pixel in FIG. 8.

Thus, even though the dynamic range of zoom levels between that illustrated in FIG. 5 and that illustrated in FIG. 11 is substantial and detail remains substantially consistent (i.e., no roads suddenly appear or disappear while smoothly zooming), the information that the user seeks to obtain at a given zooming level is not obscured by undesirable artifacts. For example, at the zoom level of z=334 meters/pixel (FIG. 5), the user may wish to gain a general sense of what primary highways exist and in what directions they extend. This information may readily be obtained even though the A4 local roads 106 are also depicted. At the zoom level of z=62.4 meters/pixel (FIG. 8), the user may wish to determine whether a particular A1 primary highway 102 or A2 primary road 108 services a particular city or neighborhood. Again, the user may obtain this information without interference from other much more detailed information, such as the existence and extent of A4 local roads 106 or even A5 dirt roads. Finally, at the zoom level of z=11.7 meters/pixel, a user may be interested in finding a particular A4 local road such as 112, and may do so without interference by significantly larger roads such as the A1 primary highway 102.

In order to achieve one or more of the various aspects of the present invention discussed above, it is contemplated that one or more computing devices execute one or more software programs that cause the computing devices to carry out appropriate actions. In this regard, reference is now made to FIGS. 12–13, which are flow diagrams illustrating process steps that are preferably carried out by the one or more computing devices and/or related equipment.

While it is preferred that the process flow is carried out by commercially available computing equipment (such as Pentium-based computers), any of a number of other techniques may be employed to carry out the process steps without departing from the spirit and scope of the present invention as claimed. Indeed, the hardware employed may be implemented utilizing any other known or hereinafter developed technologies, such as standard digital circuitry, analog circuitry, any of the known processors that are operable to execute software and/or firmware programs, one or more programmable digital devices or systems, such as programmable read only memories (PROMs), programmable array logic devices (PALs), any combination of the above, etc. Further, the methods of the present invention may be embodied in a software program that may be stored on any of the known or hereinafter developed media.

Figure 12:
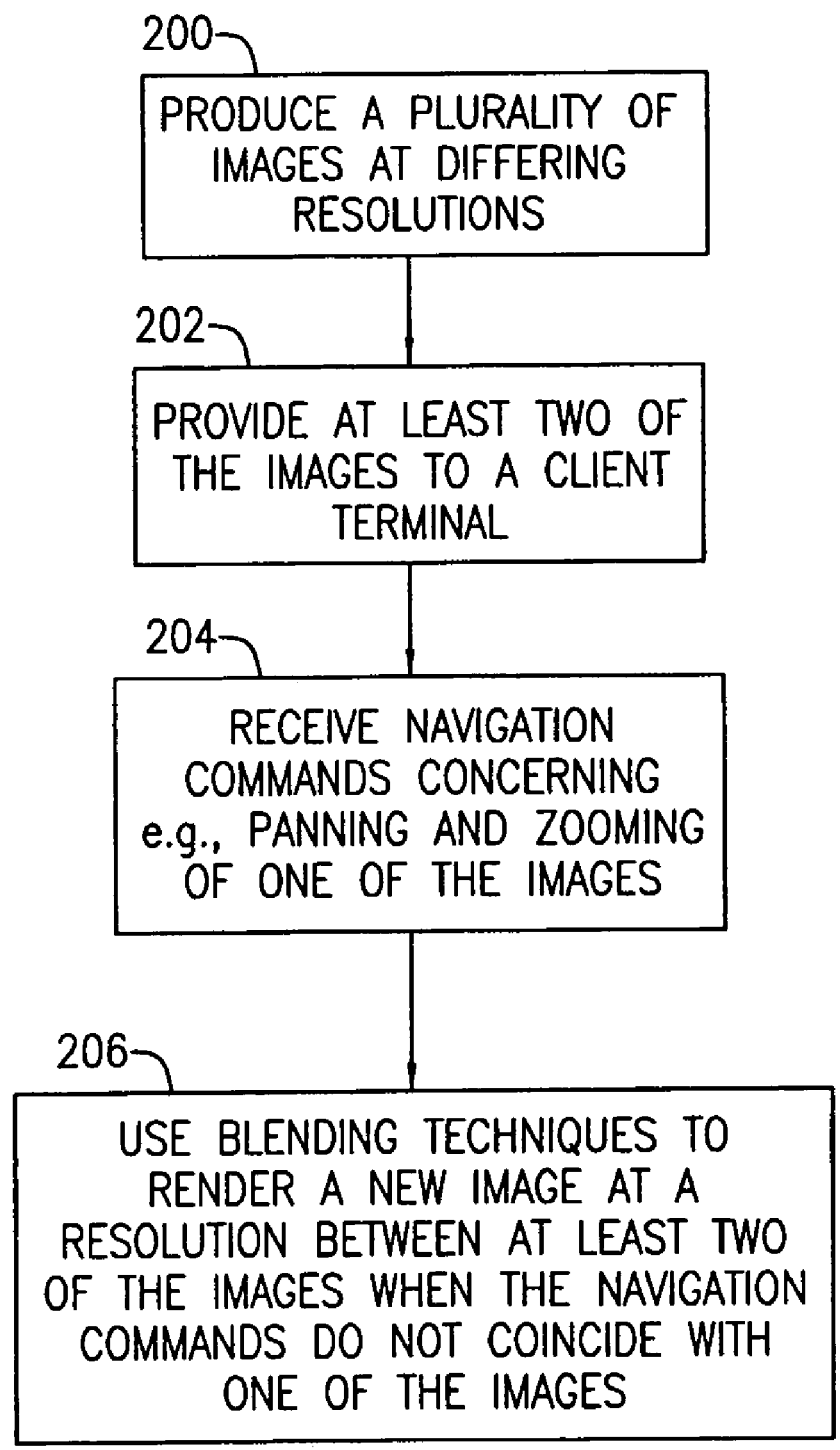
FIG. 12 is a flow diagram illustrating process steps that may be carried out in order to provide smooth and continuous navigation of an image in accordance with one or more aspects of the present invention.

FIG. 12 illustrates an embodiment of the invention in which a plurality of images are prepared (each at a different zoom level or resolution), action 200, and two or more of the images are blended together to achieve the appearance of smooth navigation, such as zooming (action 206). Although not required to practice the invention, it is contemplated that the approach illustrated in FIG. 12 be employed in connection with a service provider—client relationship. For example, a service provider would expend the resources to prepare a plurality of pre-rendered images (action 200) and make the images available to a user's client terminal over a communications channel, such as the Internet (action 202). Alternatively, the pre-rendered images may be an integral or related part of an application program that the user loads and executes on his or her computer.

It has been found through experimentation that, when the blending approach is used, a set of images at the following zoom levels work well when the image object is a roadmap: 30 meters/pixel, 50 meters/pixel, 75 meters/pixel, 100 meters/pixel, 200 meters/pixel, 300 meters/pixel, 500 meters/pixel, 1000 meters/pixel, and 3000 meters/pixel. It is noted, however, that any number of images may be employed at any number of resolutions without departing from the scope of the invention. Indeed, other image objects in other contexts may be best served by a larger or smaller number of images, where the specific zoom levels are different from the example above.

Figure 8:
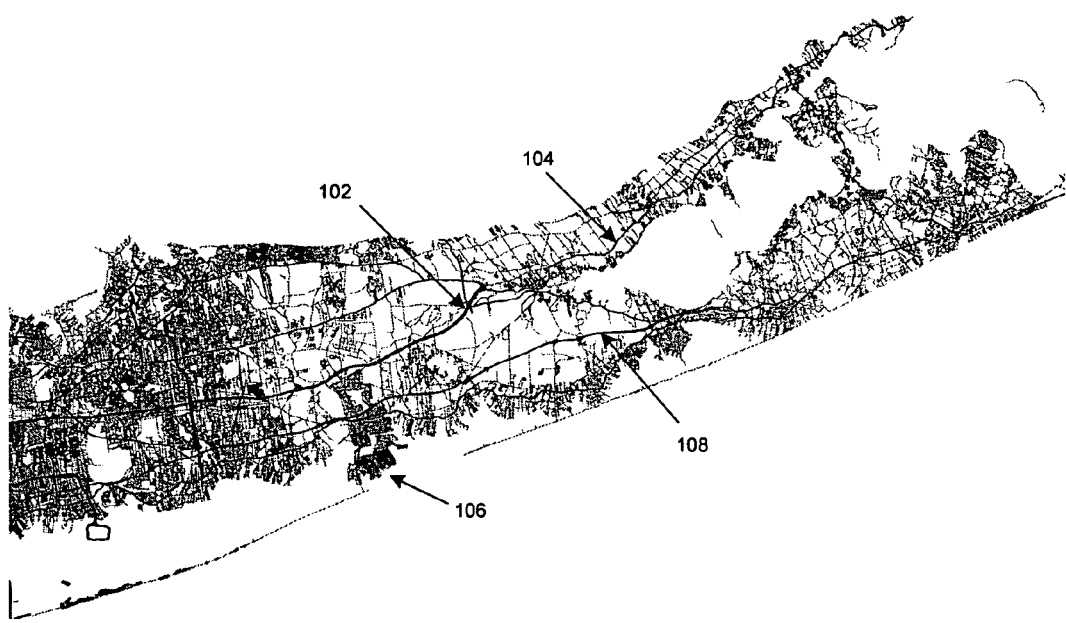
FIG. 8 is an image of Long Island produced at a zoom level of about 62.4 meters/pixel in accordance with one or more further aspects of the present invention.
Figure 9:
FIG. 9 is an image of Long Island produced at a zoom level of about 35.7 meters/pixel in accordance with one or more further aspects of the present invention.

Irrespective of how the images are obtained by the client terminal, in response to user-initiated navigation commands (action 204), such as zooming commands, the client terminal is preferably operable to blend two or more images in order to produce an intermediate resolution image that coincides with the navigation command (action 206). This blending may be accomplished by a number of methods, such as the well-known trilinear interpolation technique described by Lance Williams, *Pyramidal Parametrics,* Computer Graphics, Proc. SIGGRAPH '83, 17(3):1–11(1983), the entire disclosure of which is incorporated herein by reference. Other approaches to image interpolation are also useful in connection with the present invention, such as bicubic-linear interpolation, and still others may be developed in the future. It is noted that the present invention does not require or depend on any particular one of these blending methods. For example, as shown in FIG. 8, the user may wish to navigate to a zoom level of 62.4 meters/pixel. As this zoom level may be between two of the pre-rendered images (e.g., in this example between zoom level 50 meters/pixel and zoom level 75 meters/pixel), the desired zoom level of 62.4 meters/pixel may be achieved using the trilinear interpolation technique. Further, any zoom level between 50 meters/pixel and 75 meters/pixel may be obtained utilizing a blending method as described above, which if performed quickly enough provides the appearance of smooth and continuous navigation. The blending technique may be carried through to other zoom levels, such as the 35.7 meters/pixel level illustrated in FIG. 9. In such case, the blending technique may be performed as between the pre-rendered images of 30 meters/pixel and 50 meters/pixel of the example discussed thus far.

The above blending approach may be used when the computing power of the processing unit on which the invention is carried out is not high enough to (i) perform the rendering operation in the first instance, and/or (ii) perform image rendering "just-in-time" or "on the fly" (for example, in real time) to achieve a high image frame rate for smooth navigation. As will be discussed below, however, other embodiments of the invention contemplate use of known, or hereinafter developed, high power processing units that are capable of rendering at the client terminal for blending and/or high frame rate applications.

Figure 13:
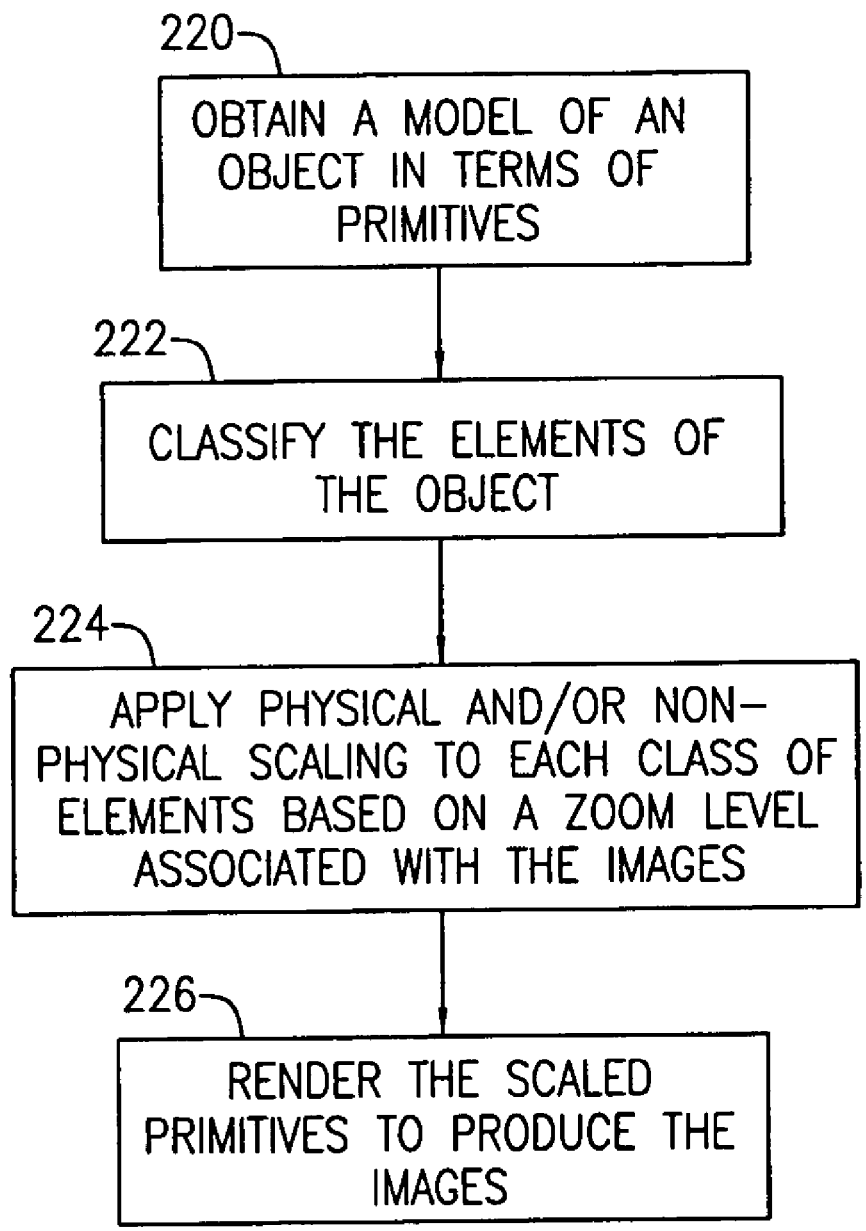
FIG. 13 is a flow diagram illustrating further process steps that may be carried out in order to smoothly navigate an image in accordance with various aspects of the present invention.

The process flow of FIG. 13 illustrates the detailed steps and/or actions that are preferably conducted to prepare one or more images in accordance with the present invention. At action 220, the information is obtained regarding the image object or objects using any of the known or hereinafter developed techniques. Usually, such image objects have been modeled using appropriate primitives, such as polygons, lines, points, etc. For example, when the image objects are roadmaps, models of the roads in any Universal Transverse Mercator (UTM) zone may readily be obtained. The model is usually in the form of a list of line segments (in any coordinate system) that comprise the roads in the zone. The list may be converted into an image in the spatial domain (a pixel image) using any of the known or hereinafter developed rendering processes so long as it incorporates certain techniques for determining the weight (e.g., apparent or real thickness) of a given primitive in the pixel (spatial) domain. In keeping with the roadmap example above, the rendering processes should incorporate certain techniques for determining the weight of the lines that model the roads of the roadmap in the spatial domain. These techniques will be discussed below.

At action 222 (FIG. 13), the elements of the object are classified. In the case of a roadmap object, the classification may take the form of recognizing already existing categories, namely, A1, A2, A3, A4, and A5. Indeed, these road elements have varying degrees of coarseness and, as will be discussed below, may be rendered differently based on this classification. At action 224, mathematical scaling is applied to the different road elements based on the zoom level. As will be discussed in more detail below, the mathematical scaling may also vary based on the element classification.

By way of background, there are two conventional techniques for rendering image elements such as the roads of a map: actual physical scaling, and pre-set pixel width. The actual physical scaling technique dictates that the roadmap is rendered as if viewing an actual physical image of the roads at different scales. A1 highways, for example, might be 16 meters wide, A2 roads might be 12 meters wide, A3 roads might be 8 meters wide, A4 roads might be 5 meters wide, and A5 roads might be 2.5 meters wide. Although this might be acceptable to the viewer when zoomed in on a small area of the map, as one zooms out, all roads, both major and minor, become too thin to make out. At some zoom level, say at the state level (e.g., about 200 meters/pixel), no roads would be seen at all.

The pre-set pixel width approach dictates that every road is a certain pixel width, such as one pixel in width on the display. Major roads, such as highways, may be emphasized by making them two pixels wide, etc. Unfortunately this approach makes the visual density of the map change as one zooms in and out. At some level of zoom, the result might be pleasing, e.g., at a small-size county level. As one zooms in, however, roads would not thicken, making the map look overly sparse. Further, as one zooms out, roads would run into each other, rapidly forming a solid nest in which individual roads would be indistinguishable.

In accordance with one or more aspects of the present invention, at action 224, the images are produced in such a way that at least some image elements are scaled up and/or down either (i) physically proportional to the zoom level; or (ii) non-physically proportional to the zoom level, depending on parameters that will be discussed in more detail below.

It is noted that the scaling being "physically proportional to the zoom level" means that the number of pixels representing the road width increases or decreases with the zoom level as the size of an element would appear to change with its distance from the human eye. The perspective formula, giving the apparent length y of an object of physical size d, is:

$$y=c \cdot d/x,$$

where c is a constant determining the angular perspective and x is the distance of the object from the viewer.

In the present invention, the linear size of an object of physical linear size d' in display pixels p is given by $$p=d' \cdot z^a,$$

where z is the zoom level in units of physical linear size/pixel (e.g. meters/pixel), and a is a power law. When a=-1 and d'=d (the real physical linear size of the object), this equation is dimensionally correct and becomes equivalent to the perspective formula, with p=y and z=x/c. This expresses the equivalence between physical zooming and perspective transformation: zooming in is equivalent to moving an object closer to the viewer, and zooming out is equivalent to moving the object farther away.

To implement non-physical scaling, a may be set to a power law other than -1, and d' may be set to a physical linear size other than the actual physical linear size d. In the context of a road map, where p may represent the displayed width of a road in pixels and d' may represent an imputed width in physical units, "non-physically proportional to the zoom level" means that the road width in display pixels increases or decreases with the zoom level in a way other than being physically proportional to the zoom level, i.e. a≠-1. The scaling is distorted in a way that achieves certain desirable results.

It is noted that "linear size" means one-dimensional size. For example, if one considers any 2 dimensional object and doubles its "linear size" then one multiplies the area by $4=2^2$. In the two dimensional case, the linear sizes of the elements of an object may involve length, width, radius, diameter, and/or any other measurement that one can read off with a ruler on the Euclidean plane. The thickness of a line, the length of a line, the diameter of a circle or disc, the length of one side of a polygon, and the distance between two points are all examples of linear sizes. In this sense the "linear size" in two dimensions is the distance between two identified points of an object on a 2D Euclidean plane. For example, the linear size can be calculated by taking the square root of $(dx^2+dy^2)$, where dx=x1-x0, dy=y1-y0, and the two identified points are given by the Cartesian coordinates (x0, y0) and (x1, y1).

The concept of "linear size" extends naturally to more than two dimensions; for example, if one considers a volumetric object, then doubling its linear size involves increasing the volume by $8=2^3$. Similar measurements of linear size can also be defined for non-Euclidean spaces, such as the surface of a sphere.

Any power law a<0 will cause the rendered size of an element to decrease as one zooms out, and increase as one zooms in. When a<-1, the rendered size of the element will decrease faster than it would with proportional physical scaling as one zooms out. Conversely, when -1<a<0, the size of the rendered element decreases more slowly than it would with proportional physical scaling as one zooms out.

In accordance with at least one aspect of the invention, p(z), for a given length of a given object, is permitted to be substantially continuous so that during navigation the user does not experience a sudden jump or discontinuity in the size of an element of the image (as opposed to the conventional approaches that permit the most extreme discontinuity—a sudden appearance or disappearance of an element during navigation). In addition, it is preferred that p(z) monotonically decrease with zooming out such that zooming out causes the elements of the object become smaller (e.g., roads to become thinner), and such that zooming in causes the elements of the object become larger. This gives the user a sense of physicality about the object(s) of the image.

Figure 14:
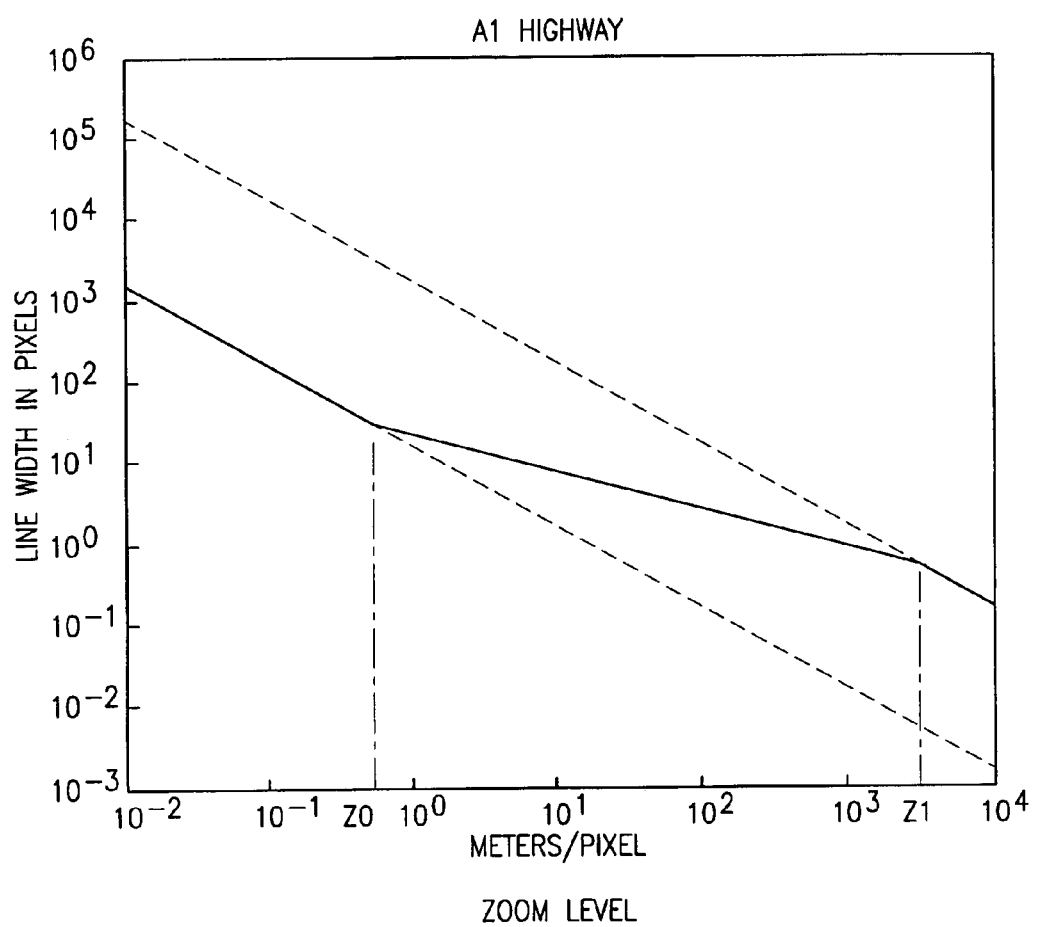
FIG. 14 is a log-log graph of a line width in pixels versus a zoom level in meters/pixel illustrating physical and non-physical scaling in accordance with one or more further aspects of the present invention.

The scaling features discussed above may be more fully understood with reference to FIG. 14, which is a log-log graph of a rendered line width in pixels for an A1 highway versus the zoom level in meters/pixel. (Plotting log(z) on the x-axis and log(p) on the y-axis is convenient because the plots become straight lines due to the relationship $log(x^a)$ $=a \cdot log(x)$). The basic characteristics of the line (road) width versus zoom level plot are:

(i) that the scaling of the road widths may be physically proportional to the zoom level when zoomed in (e.g., up to about 0.5 meters/pixel);

(ii) that the scaling of the road widths may be non-physically proportional to the zoom level when zoomed out (e.g., above about 0.5 meters/pixel); and (iii) that the scaling of the road widths may be physically proportional to the zoom level when zoomed further out (e.g., above about 50 meters/pixel or higher depending on parameters which will be discussed in more detail below).

As for the zone in which the scaling of the road widths is physically proportional to the zoom level, the scaling formula of $p=d'\cdot z^a$, is employed where $a=-1$. In this example, a reasonable value for the physical width of an actual A1 highway is about $d'=16$ meters. Thus, the rendered width of the line representing the A1 highway monotonically decreases with physical scaling as one zooms out at least up to a certain zoom level $z0$, say $z0=0.5$ meters/pixel.

The zoom level for $z0=0.5$ is chosen to be an inner scale below which physical scaling is applied. This avoids a non-physical appearance when the roadmap is combined with other fine-scale GIS content with real physical dimensions. In this example, $z0=0.5$ meters/pixel, or 2 pixels/meter, which when expressed as a map scale on a 15 inch display (with 1600×1200 pixel resolution) corresponds to a scale of about 1:2600. At $d=16$ meters, which is a reasonable real physical width for A1 roads, the rendered road will appear to be its actual size when one is zoomed in (0.5 meters/pixel or less). At a zoom level of 0.1 meters/pixel, the rendered line is about 160 pixels wide. At a zoom level of 0.5 meters/pixel, the rendered line is 32 pixels wide.

As for the zone in which the scaling of the road widths is non-physically proportional to the zoom level, the scaling formula of $p=d'\cdot z^a$, is employed where $-1<a<0$ (within a range of zoom levels $z0$ and $z1$). In this example, the non-physical scaling is performed between about $z0=0.5$ meters/pixel and $z1=3300$ meters/pixel. Again, when $-1<a<0$, the width of the rendered road decreases more slowly than it would with proportional physical scaling as one zooms out. Advantageously, this permits the A1 roads to remain visible (and distinguishable from other smaller roads) as one zooms out. For example, as shown in FIG. 5, the A1 roads 102 remains visible and distinguishable from other roads at the zoom level of $z=334$ meters/pixel. Assuming that the physical width of the A1 roads is $d'=d=16$ meters, the width of the rendered line using physical scaling would have been about 0.005 pixels at a zoom level of about 3300 meters/pixel, rendering it virtually invisible. Using non-physical scaling, however, where $-1<a<0$ (in this example, a is about $-0.473$), the width of the rendered line is about 0.8 pixels at a zoom level of 3300 meters/pixel, rendering it clearly visible.

It is noted that the value for $z1$ is chosen to be the most zoomed-out scale at which a given road still has "greater than physical" importance. By way of example, if the entire U.S. is rendered on a 1600×1200 pixel display, the resolution would be approximately 3300 meters/pixel or 3.3 kilometers/pixel. If one looks at the entire world, then there may be no reason for U.S. highways to assume enhanced importance relative to the view of the country alone.

Thus, at zoom levels above $z1$, which in the example above is about 3300 meters/pixel, the scaling of the road widths is again physically proportional to the zoom level, but preferably with a large d' (much greater than the real width d) for continuity of $p(z)$. In this zone, the scaling formula of $p=d'\cdot z^a$ is employed where $a=-1$. In order for the rendered road width to be continuous at $z1=3300$ meters/pixel, a new imputed physical width of the A1 highway is chosen, for example, $d'=1.65$ kilometers. $z1$ and the new value for d' are preferably chosen in such a way that, at the outer scale $z1$, the rendered width of the line will be a reasonable number of pixels. In this case, at a zoom level in which the entire nation may be seen on the display (about 3300 meters/pixel), A1 roads may be about ½ pixel wide, which is thin but still clearly visible; this corresponds to an imputed physical road width of 1650 meters, or 1.65 kilometers.

The above suggests a specific set of equations for the rendered line width as a function of the zoom level:

$p(z)=d0\cdot z^{-1}$, if $z \leq z0$ $p(z)=d1\cdot z^a$, if $z0<z<z1$, $p(z)=d2\cdot z^{-1}$, if $z \geq z1$.

The above form of $p(z)$ has six parameters: $z0$, $z1$, $d0$, $d1$, $d2$ and a. $z0$ and $z1$ mark the scales at which the behavior of $p(z)$ changes. In the zoomed-in zone ($z \leq z0$), zooming is physical (i.e., the exponent of z is $-1$), with a physical width of $d0$, which preferably corresponds to the real physical width d. In the zoomed-out zone ($z \geq z1$), zooming is again physical, but with a physical width of $d1$, which in general does not correspond to d. Between $z0$ and $z1$, the rendered line width scales with a power law of a, which can be a value other than $-1$. Given the preference that $p(z)$ is continuous, specifying $z0$, $z1$, $d0$ and $d2$ is sufficient to uniquely determine $d1$ and a, which is clearly shown in FIG. 14.

The approach discussed above with respect to A1 roads may be applied to the other road elements of the roadmap object. An example of applying these scaling techniques to the A1, A2, A3, A4, and A5 roads is illustrated in the log-log graph of FIG. 15. In this example, $z0=0.5$ meters/pixel for all roads, although it may vary from element to element depending on the context. As A2 roads are generally somewhat smaller that A1 roads, $d0=12$ meters. Further, A2 roads are "important," e.g., on the U.S. state level, so $z1=312$ meters/pixel, which is approximately the rendering resolution for a single state (about 1/10 of the country in linear scale). At this scale, it has been found that line widths of one pixel are desirable, so $d2=312$ meters is a reasonable setting.

Using the general approach outlined above for A1 and A2 roads, the parameters of the remaining elements of the roadmap object may be established. A3 roads: $d0=8$ meters, $z0=0.5$ meters/pixel, $z1=50$ meters/pixel, and $d2=100$ meters. A4 streets: $d0=5$ meters, $z0=0.5$ meters/pixel, $z1=20$ meters/pixel, and $d2=20$ meters. And A5 dirt roads: $d0=2.5$ meters, $z0=0.5$ meters/pixel, $z1=20$ meters/pixel, and $d2=20$ m. It is noted that using these parameter settings, A5 dirt roads look more and more like streets at zoomed-out zoom levels, while their physical scale when zoomed in is half as wide.

Figure 15:
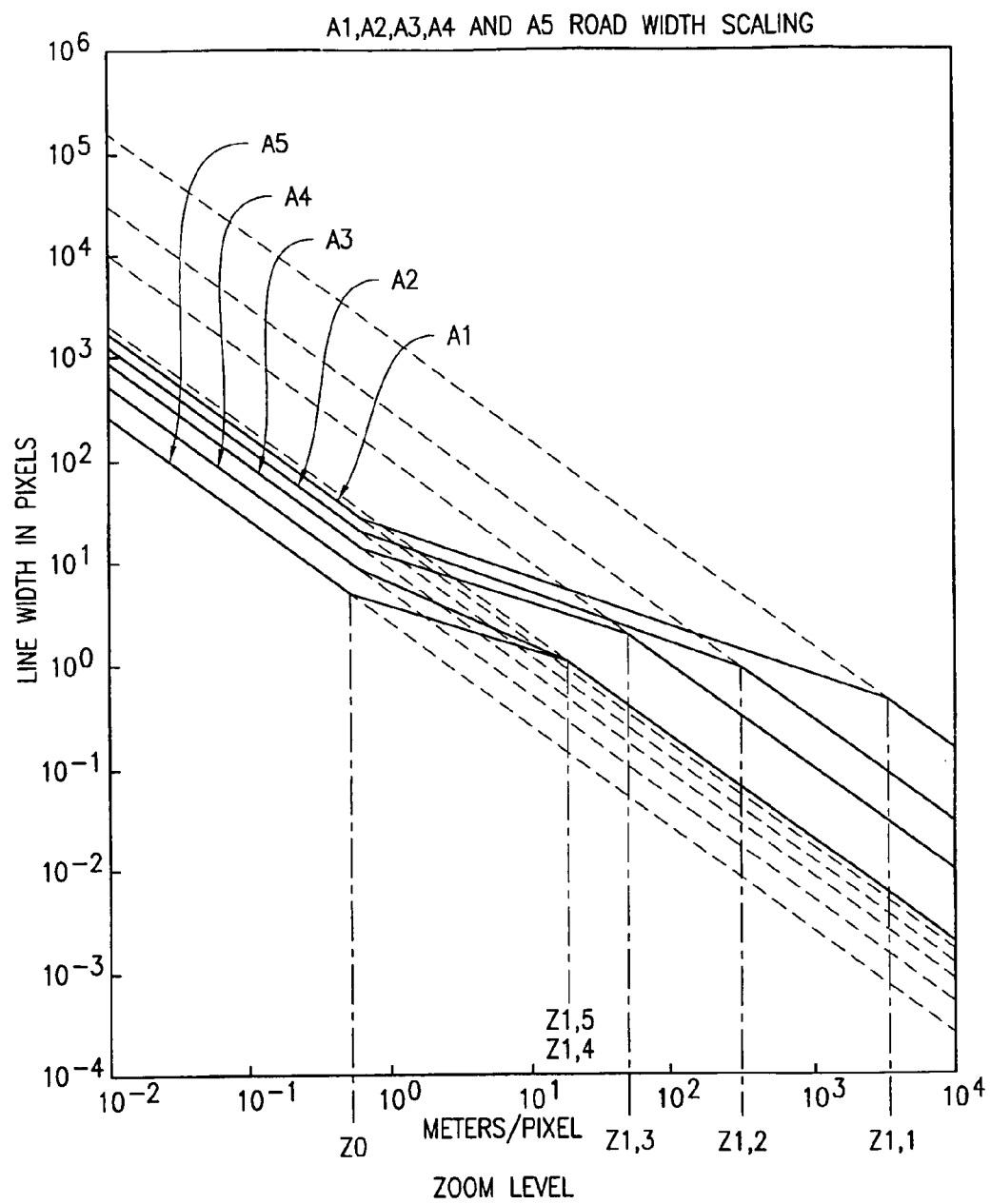
FIG. 15 is a log-log graph illustrating variations in the physical and non-physical scaling of FIG. 14.

The log-log plot of FIG. 15 summarizes the scaling behaviors for the road types. It is noted that at every scale the apparent width of A1>A2>A3>A4>=A5. Note also that, with the exception of dirt roads, the power laws all come out in the neighborhood of $a=-0.41$. The dotted lines all have a slope of $-1$ and represent physical scaling at different physical widths. From the top down, the corresponding physical widths of these dotted lines are: 1.65 kilometers, 312 meters, 100 meters, 20 meters, 16 meters, 12 meters, 8 meters, 5 meters, and 2.5 meters.

When interpolation between a plurality of pre-rendered images is used, it is possible in many cases to ensure that the resulting interpolation is humanly indistinguishable or nearly indistinguishable from an ideal rendition of all lines or other primitive geometric elements at their correct pixel widths as determined by the physical and non-physical scaling equations. To appreciate this alternative embodiment of the current invention, some background on antialiased line drawing will be presented below.

Figure 16:
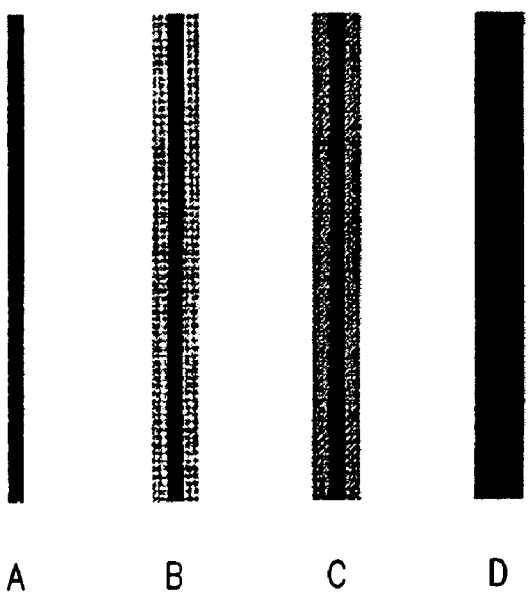
FIGS. 16A–D illustrate respective antialiased vertical lines whose endpoints are precisely centered on pixel coordinates.

The discussion of antialiased line drawing will be presented in keeping with the roadmap example discussed at length above, in which all primitive elements are lines, and the line width is subject to the scaling equations as described previously. With reference to FIG. 16A, a one pixel wide vertical line drawn in black on white background, such that the horizontal position of the line is aligned exactly to the pixel grid, consists simply of a 1-pixel-wide column of black pixels on a white background. In accordance with various aspects of the present invention, it is desirable to consider and accommodate the case where the line width is a non-integral number of pixels. With reference to FIG. 16B, if the endpoints of a line remain fixed, but the weight of the line is increased to be 1.5 pixels wide, then on an anti-aliased graphics display, the columns of pixels to the left and right of the central column are drawn at 25% grey. With reference to FIG. 16C, at 2 pixels wide, these flanking columns are drawn at 50% grey. With reference to FIG. 16D, at 3 pixels wide, the flanking columns are drawn at 100% black, and the result is three solid black columns as expected.

This approach to drawing lines of non-integer width on a pixellated display results in a sense (or illusion) of visual continuity as line width changes, allowing lines of different widths to be clearly distinguished even if they differ in width only by a fraction of a pixel. In general, this approach, known as antialiased line drawing, is designed to ensure that the line integral of the intensity function (or "1-intensity" function, for black lines on a white background) over a perpendicular to the line drawn is equal to the line width. This method generalizes readily to lines whose endpoints do not lie precisely in the centers of pixels, to lines which are in other orientations than vertical, and to curves.

Note that drawing the antialiased vertical lines of FIGS. 16A–D could also be accomplished by alpha-blending two images, one (image A) in which the line is 1 pixel wide, and the other (image B) in which the line is 3 pixels wide. Alpha blending assigns to each pixel on the display (1-alpha)*(corresponding pixel in image A)+alpha*(corresponding pixel in image B). As alpha is varied between zero and one, the effective width of the rendered line varies smoothly between one and three pixels. This alpha-blending approach only produces good visual results in the most general case if the difference between the two rendered line widths in images A and B is one pixel or less; otherwise, lines may appear haloed at intermediate widths. This same approach can be applied to rendering points, polygons, and many other primitive graphical elements at different linear sizes.

Figure 17:
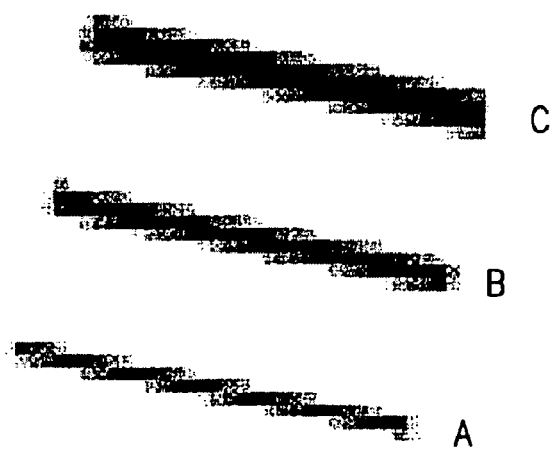
FIGS. 17A–C illustrate respective antialiased lines on a slant, with endpoints not positioned to fall at exact pixel coordinates.

Turning again to FIGS. 16A–D, the 1.5 pixel-wide line (FIG. 16B) and the 2 pixel-wide line (FIG. 16C) can be constructed by alpha-blending between the 1 pixel wide line (FIG. 16A) and the 3 pixel wide line (FIG. 16D). With reference to FIGS. 17A–C, a 1 pixel wide line (FIG. 17A), a 2 pixel wide line (FIG. 17B) and a 3 pixel wide line (FIG. 17C) are illustrated in an arbitrary orientation. The same principle applies to the arbitrary orientation of FIGS. 17A–C as to the case where the lines are aligned exactly to the pixel grid, although the spacing of the line widths between which to alpha-blend may need to be finer than two pixels for good results.

In the context of the present map example, a set of images of different resolutions can be selected for pre-rendition with reference to the log-log plots of FIGS. 14–15. For example, reference is now made to FIG. 18, which is substantially similar to FIG. 14 except that FIG. 18 includes a set of horizontal lines and vertical lines. The horizontal lines indicate line widths between 1 and 10 pixels, in increments of one pixel. The vertical lines are spaced such that line width over the interval between two adjacent vertical lines changes by no more than two pixels. Thus, the vertical lines represent a set of zoom values suitable for pre-rendition, wherein alpha-blending between two adjacent such pre-rendered images will produce characteristics nearly equivalent to rendering the lines representing roads at continuously variable widths.

Figure 18:
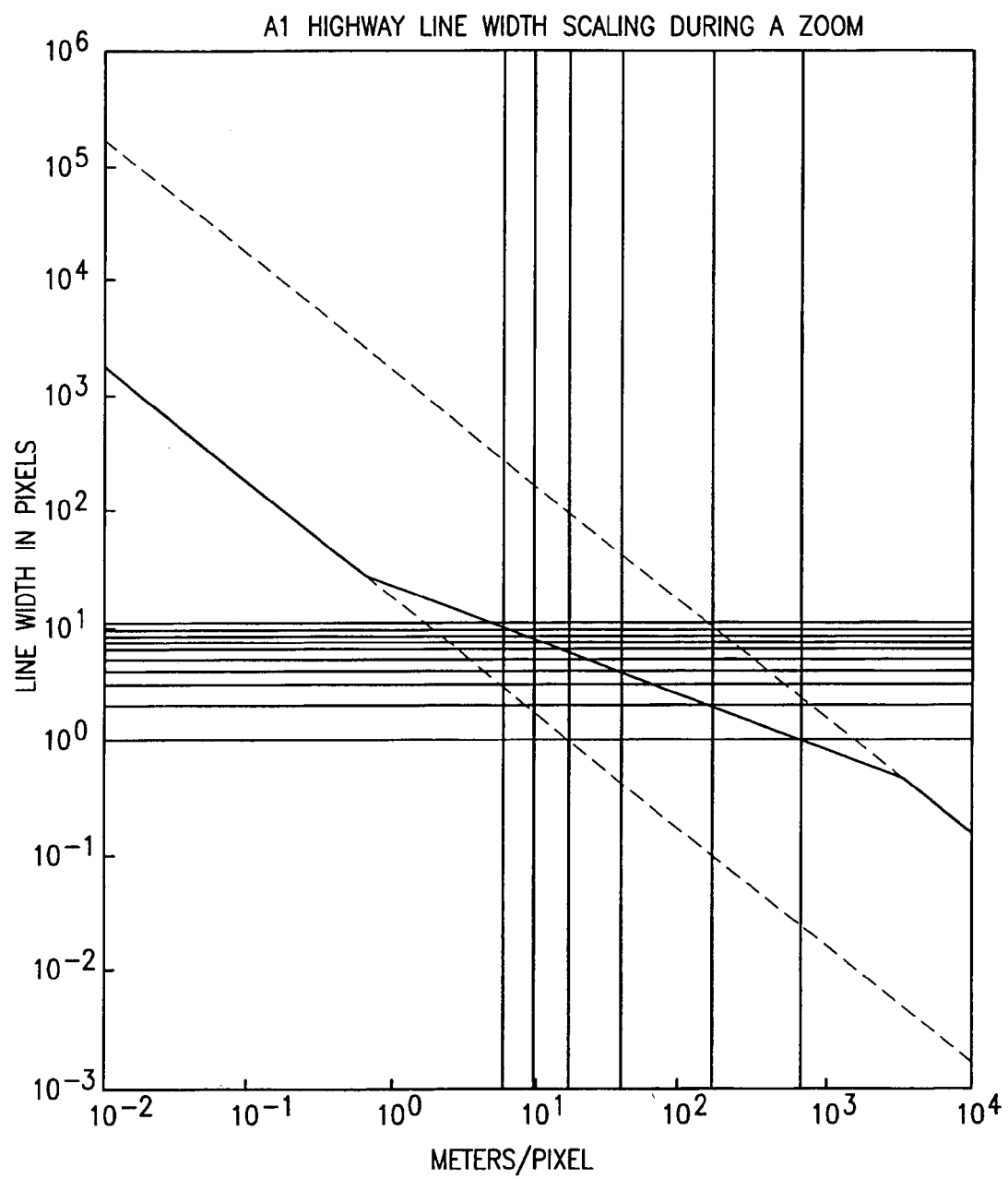
FIG. 18 is the log-log graph of line width versus zoom level of FIG. 14 including horizontal lines indicating incremental line widths, and vertical lines spaced such that the line width over the interval between two adjacent vertical lines changes by no more than two pixels.

Interpolation between the six resolutions represented by the vertical lines shown in FIG. 18 is sufficient to render the A1 highways accurately using the scaling curve shown at about nine meters/pixel and above. Rendition below about nine meters/pixel does not require pre-rendition, as such views are very zoomed-in and thus show very few roads, making it more computationally efficient (and more efficient with respect to data storage requirements) to render them vectorially than to interpolate between pre-rendered images. At resolutions of more than about 1000 meters/pixel (such views encompass large fractions of the Earth's surface), the final pre-rendered image alone can be used, as it is a rendition using 1 pixel wide lines. Lines that are thinner than a single pixel render the same pixels more faintly. Hence, to produce an image in which the A1 lines are 0.5 pixels wide, the 1 pixel wide line image can be multiplied by an alpha of 0.5.

In practice, a somewhat larger set of resolutions are pre-rendered, such that over each interval between resolutions, none of the scaling curves of FIG. 15 varies by more than one pixel. Reducing the allowed variation to one pixel can result in improved rendering quality. Notably, the tiling techniques contemplated and discussed in the following co-pending application may be considered in connection with the present invention: U.S. patent application Ser. No. 10/790,253, entitled SYSTEM AND METHOD FOR EXACT RENDERING IN A ZOOMING USER INTERFACE, filed Mar. 1, 2004, the entire disclosure of which is hereby incorporated by reference. This tiling technique may be employed for resolving an image at a particular zoom level, even if that level does not coincide with a pre-rendered image. If each image in the somewhat larger set of resolutions is pre-rendered at the appropriate resolution and tiled, then the result is a complete system for zooming and panning navigation through a roadmap of arbitrary complexity, such that all lines appear to vary in width continuously in accordance with the scaling equations disclosed herein.

Advantageously, employing the above-discussed aspects of the present invention, the user enjoys the appearance of smooth and continuous navigation through the various zoom levels. Further, little or no detail abruptly appears or disappears when zooming from one level to another. This represents a significant advancement over the state of the art.

It is contemplated that the various aspects of the present invention may be applied in numerous products, such as interactive software applications over the Internet, automobile-based software applications and the like. For example, the present invention may be employed by an Internet website that provides maps and driving directions to client terminals in response to user requests. Alternatively, various aspects of the invention may be employed in a GPS navigation system in an automobile. The invention may also be incorporated into medical imaging equipment, whereby detailed information concerning, for example, a patient's circulatory system, nervous system, etc. may be rendered and navigated as discussed hereinabove. The applications of the invention are too numerous to list in their entirety, yet a skilled artisan will recognize that they are contemplated herein and fall within the scope of the invention as claimed.

The present invention may also be utilized in connection with other applications in which the rendered images provide a means for advertising and otherwise advancing commerce. Additional details concerning these aspects and uses of the present invention may be found in U.S. Provisional Patent Application No. 60/553,803, entitled METHODS AND APPARATUS FOR EMPLOYING MAPPING TECHNIQUES TO ADVANCE COMMERCE, filed on even date herewith, the entire disclosure of which is hereby incorporated by reference.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising: zooming into or out of an image having at least one object, wherein at least some elements of the at least one object are scaled up and/or down in a way that is non-physically proportional to one or more zoom levels associated with the zooming, wherein the non-physically proportional scaling may be expressed by the following formula: $p=d'\cdot z^a$, where p is a linear size in pixels of one or more elements of the object at the zoom level, d' is an imputed linear size of the one or more elements of the object in physical units, z is the zoom level in units of physical linear size/pixel, and a is a power law where $a \neq -1$.

2. The method of claim 1, wherein at least one of d' and a may vary for one or more elements of the object.

3. The method of claim 1, wherein the power law is $-1<a<0$ within a range of zoom levels z0 and z1, where z0 is of a lower physical linear size/pixel than z1.

4. The method of claim 3, wherein at least one of z0, z1, d' and a may vary for one or more elements of the object.

5. The method of claim 1, wherein at least some elements of the at least one object are also scaled up and/or down in a way that is physically proportional to one or more zoom levels associated with the zooming.

6. The method of claim 5, wherein the physically proportional scaling may be expressed by the following formula: $p=c\cdot d/z$, where p is a linear size in pixels of one or more elements of the object, c is a constant, d is a real or imputed linear size in physical units of the one or more elements of the object, and z is the zoom level in physical linear size/pixel.

7. The method of claim 5, wherein:
the elements of the object are of varying degrees of coarseness; and
the scaling of the elements at a given zoom level are physically proportional or non-physically proportional based on at least one of: (I) a degree of coarseness of such elements; and (ii) the zoom level.

8. The method of claim 7, wherein:
the object is a roadmap, the elements of the object are roads, and the varying degrees of coarseness are road hierarchies; and
the scaling of a given road at a given zoom level is physically proportional or non-physically proportional based on: (I) the road hierarchy of the given road; and (ii) the zoom level.

9. A storage medium containing one or more software programs that are operable to cause a processing unit to execute actions, comprising: zooming into or out of an image having at least one object, wherein at least some elements of the at least one object are scaled up and/or down in a way that is non-physically proportional to one or more zoom levels associated with the zooming, wherein the non-physically proportional scaling may be expressed by the following formula: $p=d'\cdot z^a$, where p is a linear size in pixels of one or more elements of the object at the zoom level, d' is an imputed linear size of the one or more elements of the object in physical units, z is the zoom level in units of physical linear size/pixel, and a is a power law where $a \neq -1$.

10. The method of claim 9, wherein at least one of d' and a may vary for one or more elements of the object.

11. The storage medium of claim 9, wherein the scale power is $-1<a<0$ within a range of zoom levels between z0 and z1, where z0 is of a lower physical linear size/pixel than z1.

12. The storage medium of claim 11, wherein at least one of z0 and z1 may vary for one or more elements of the object.

13. The storage medium of claim 9, wherein at least some elements of the at least one object are also scaled up and/or down in a way that is physically proportional to one or more zoom levels associated with the zooming.

14. The storage medium of claim 13, wherein the physically proportional scaling may be expressed by the following formula: $p=c\cdot d/z$, where p is a linear size in pixels of one or more elements of the object, c is a constant, d is a real or imputed linear size in physical units of the one or more elements of the object, and z is the zoom level in physical linear size/pixel.

15. The storage medium of claim 13, wherein:
the elements of the object are of varying degrees of coarseness; and
the scaling of the elements at a given zoom level are physically proportional or non-physically proportional based on at least one of: (I) a degree of coarseness of such elements; and (ii) the zoom level.

16. The storage medium of claim 15, wherein:
the object is a roadmap, the elements of the object are roads, and the varying degrees of coarseness are road hierarchies; and
the scaling of a given road at a given zoom level is physically proportional or non-physically proportional based on: (I) the road hierarchy of the given road; and (ii) the zoom level.

17. An apparatus including a processing unit operating under the control of one or more software programs that are operable to cause the processing unit to execute actions, comprising: zooming into or out of an image having at least one object, wherein at least some elements of the at least one object are scaled up and/or down in a way that is non-physically proportional to one or more zoom levels associated with the zooming, wherein the non-physically proportional scaling may be expressed by the following formula: $p=d'\cdot z^a$, where p is a linear size in pixels of one or more elements of the object at the zoom level, d' is an imputed linear size of the one or more elements of the object in physical units, z is the zoom level in units of physical linear size/pixel, and a is a power law where a≠1.

18. The apparatus of claim 17, wherein at least one of d' and a may vary for one or more elements of the object.

19. The apparatus of claim 17, wherein the power law is −1<a<0 within a range of zoom levels z0 and z1, where z0 is of a lower physical linear size/pixel than z1.

20. The apparatus of claim 19, wherein at least one of z0 and z1 may vary for one or more elements of the object.

21. The apparatus of claim 17, wherein at least some elements of the at least one object are also scaled up and/or down in a way that is physically proportional to one or more zoom levels associated with the zooming.

22. The apparatus of claim 21, wherein the physically proportional scaling may be expressed by the following formula: p=c·d/z, where p is a linear size in pixels of one or more elements of the object, c is a constant, d is a real or imputed linear size in physical units of the one or more elements of the object, and z is the zoom level in physical linear size/pixel.

23. The apparatus of claim 21, wherein:
the elements of the object are of varying degrees of coarseness; and
the scaling of the elements at a given zoom level are physically proportional or non-physically proportional based on at least one of: (I) a degree of coarseness of such elements; and (ii) the zoom level.

24. The apparatus of claim 23, wherein:
the object is a roadmap, the elements of the object are roads, and the varying degrees of coarseness are road hierarchies; and
the scaling of a given road at a given zoom level is physically proportional or non-physically proportional based on: (I) the road hierarchy of the given road; and (ii) the zoom level.

25. A method, comprising: preparing a plurality of images of different zoom levels of at least one object, wherein at least some elements of the at least one object are scaled up and/or down in a way that is non-physically proportional to one or more zoom levels, wherein scaling may be expressed by the following formula: $p=d'\cdot z^a$, where p is a linear size in pixels of one or more elements of the object at the zoom level, d' is an imputed linear size of the one or more elements of the object in physical units, z is the zoom level in units of physical linear size/pixel, and a is a power law where a≠−1.

26. The method of claim 25, wherein the images are pre-rendered at a source terminal for delivery to a client terminal.

27. The method of claim 25, wherein at least one of d' and a may vary for one or more elements of the object.

28. The method of claim 25, wherein the power law is −1<a<0 within a range of zoom levels between z0 and z1, where z0 is of a lower physical linear size/pixel than z1.

29. The method of claim 28, wherein at least one of z0 and z1 may vary for one or more elements of the object.

30. The method of claim 25, wherein at least some elements of the at least one object are also scaled up and/or down in a way that is physically proportional to one or more zoom levels associated with the zooming.

31. The method of claim 30, wherein the physically proportional scaling may be expressed by the following formula: p=c·d/z, where p is a linear size in pixels of one or more elements of the object, c is a constant, d is a real or imputed linear size in physical units of the one or more elements of the object, and z is the zoom level in physical linear size/pixel.

32. The method of claim 30, wherein:
the elements of the object are of varying degrees of coarseness; and
the scaling of the elements at a given zoom level are physically proportional or non-physically proportional based on at least one of: (I) a degree of coarseness of such elements; and (ii) the zoom level.

33. The method of claim 32, wherein:
the object is a roadmap, the elements of the object are roads, and the varying degrees of coarseness are road hierarchies; and
the scaling of a given road at a given zoom level is physically proportional or non-physically proportional based on: (I) the road hierarchy of the given road; and (ii) the zoom level.

* * * * *